(12) United States Patent
Arai et al.

(10) Patent No.: US 10,120,592 B2
(45) Date of Patent: Nov. 6, 2018

(54) STORAGE DEVICE AND MAINTENANCE/OPERATION SYSTEM THEREFOR

(71) Applicant: Hitachi, Ltd., Tokyo (JP)

(72) Inventors: Masahiro Arai, Tokyo (JP); Masahiro Tsuruya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 15/125,740

(22) PCT Filed: Sep. 26, 2014

(86) PCT No.: PCT/JP2014/075702
§ 371 (c)(1),
(2) Date: Sep. 13, 2016

(87) PCT Pub. No.: WO2016/046977
PCT Pub. Date: Mar. 31, 2016

(65) Prior Publication Data
US 2017/0003891 A1   Jan. 5, 2017

(51) Int. Cl.
*G06F 3/06* (2006.01)
*G06F 3/08* (2006.01)
*G06F 11/10* (2006.01)

(52) U.S. Cl.
CPC .......... *G06F 3/0616* (2013.01); *G06F 3/0631* (2013.01); *G06F 3/0644* (2013.01);
(Continued)

(58) Field of Classification Search
CPC .... G06F 3/0647; G06F 3/0659; G06F 3/0644; G06F 3/0616; G06F 3/0631; G06F 3/0653; G06F 3/0688; G06F 11/1076
(Continued)

(56) References Cited

U.S. PATENT DOCUMENTS

2012/0005402 A1   1/2012   Yamamoto et al.
2014/0281168 A1*  9/2014   Koseki ................. G06F 11/108
                                                        711/103

FOREIGN PATENT DOCUMENTS

JP   05-100801 A    4/1993
WO   2011/010344 A1 1/2011
WO   2014/141411 A1 9/2014

OTHER PUBLICATIONS

International Search Report of PCT/JP2014/075702 dated Jan. 6, 2015.

* cited by examiner

*Primary Examiner* — Jasmine Song
(74) *Attorney, Agent, or Firm* — Mattingly & Malur, PC

(57) ABSTRACT

A storage subsystem constituting a pool using storage media having rewrite life and providing a logical volume having a virtual capacity to a host, wherein the storage subsystem monitors whether shortage of a remaining rewrite life of the capacity pool will occur or not within an operation period of the storage subsystem, and when it is determined that shortage of the remaining rewrite life will occur, the subsystem converts the rewrite life required to cover the shortage into drive capacity and indicates the same, or indicates the same by reducing an existing pool capacity, and requests maintenance of the subsystem. A maintenance method is provided, wherein elongation of life is executed by adding a capacity to the pool at the time of indication, and as for addition of capacity other than the elongation of life described above, a maintenance fee is charged.

15 Claims, 12 Drawing Sheets

(52) U.S. Cl.
CPC .......... *G06F 3/0647* (2013.01); *G06F 3/0653* (2013.01); *G06F 3/0659* (2013.01); *G06F 3/0688* (2013.01); *G06F 3/08* (2013.01); *G06F 11/1076* (2013.01)

(58) Field of Classification Search
USPC ........................................................ 711/103
See application file for complete search history.

| No | Serial Number | Capacity | Belonging RG | Consumption Life | Operation Time | Set BW |
|---|---|---|---|---|---|---|
| 1 | HAF16A | 1.6TB | RG0 | 85% | 34,278 | 12PB |
| 2 | HAF16A | 1.6TB | RG0 | 84% | 34,278 | 12PB |
| 3 | HAF16A | 1.6TB | RG0 | 85% | 34,278 | 12PB |
| 4 | HAF16A | 1.6TB | RG0 | 85% | 34,278 | 12PB |
| 5 | HAF32A | 3.2TB | RG2 | 1% | 20,148 | 12PB |
| ... | ... | ... | ... | ... | ... | ... |

| No | RG | RG Capacity | Belonging Pool | Remaining BW | State |
|---|---|---|---|---|---|
| 1 | RG0 | 4.8TB | PVOL0 | 3.2PB | Good |
| 2 | RG1 | 4.8TB | PVOL0 | 3.0PB | Good |
| 3 | RG2 | 9.6TB | PVOL0 | 8.8PB | Good |
| 4 | RG3 | 10.2TB | PVOL1 | 50PB | Good |
| 5 | RG4 | 10.2TB | PVOL1 | 50PB | Good |
| ... | ... | ... | ... | ... | |

| No | Pool | Capacity | Remaining BW | Shortage of Capacity to Product Life | State |
|---|---|---|---|---|---|
| 1 | PVOL0 | 19.2TB | 15.0PB | 24PB | Warning |
| 2 | PVOL1 | 20.4TB | 42.0PB | - | Good |
| ... | ... | ... | ... | ... | ... |

280

Fig. 8
(1)
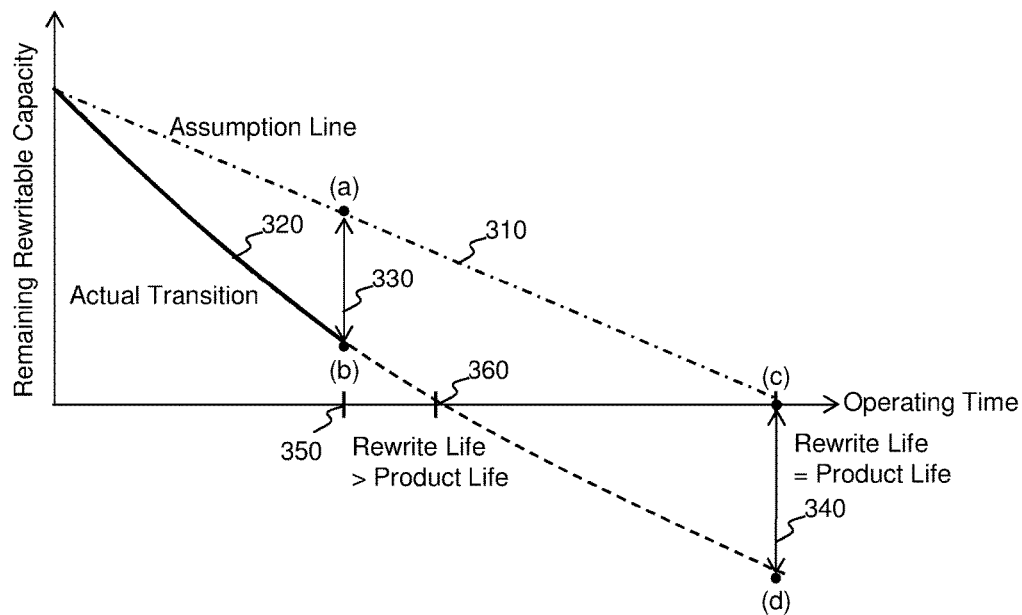
(2)
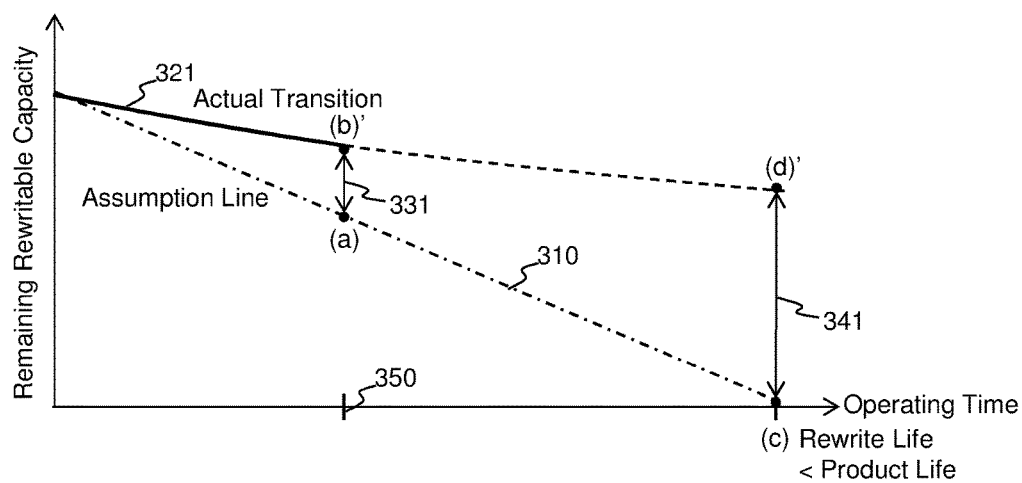

Fig. 11

| No | RG | Maintenance Drive A (BW:12PB) | Maintenance Drive B (BW:24PB) |
|---|---|---|---|
| 1 | 3D+1P | 36PB | ... |
| 2 | 4D+1P | 48PB | ... |
| 3 | 5D+1P | 60PB | ... |
| 4 | 6D+1P | 72PB | ... |
| 5 | 7D+1P | 84PB | ... |
| 6 | 8D+1P | 96PB | ... |
| 7 | 9D+1P | 108PB | ... |
| 8 | 10D+1P | 120PB | ... |
| 9 | 11D+1P | 132PB | ... |
| 10 | 3D+2P | 36PB | ... |
| 11 | 4D+2P | 48PB | ... |
| 12 | 5D+2P | 60PB | ... |
| 13 | 6D+2P | 72PB | ... |
| 14 | 7D+2P | 84PB | ... |
| 15 | 8D+2P | 96PB | ... |
| 16 | 9D+2P | 108PB | ... |
| 17 | 10D+2P | 120PB | ... |
| ... | ... | ... | ... |

600

STORAGE DEVICE AND MAINTENANCE/OPERATION SYSTEM THEREFOR

TECHNICAL FIELD

The present invention relates to a storage subsystem equipped with semiconductor storage media having a rewrite life, and a maintenance operation method thereof.

BACKGROUND ART

Recently, in computers and storage systems, semiconductor storage media enabling I/O accesses at speeds higher than HDDs (Hard Disk Drives) are used. For example, SSDs (Solid State Drives) utilizing NAND type flash memories are a typical example of such media. The flash memory stores data by applying high voltage to floating gates enclosed via insulator films, to move electrons in and out. Insulator films are worn by the forced passing of electrons, so that there is a limitation in the rewritable frequency of data. Along with the refinement of processes, the rewritable frequency is being reduced. Therefore, in storage systems using SSDs and other flash memories, it is necessary to perform operation considering the rewrite life in addition to the management of capacity.

Therefore, in cases where the rewrite life is ended prior to the aging life of a product (which is five years, in the case of enterprise products), the user had to cope with the problem by either one of the following two methods.

One method is to wait for failure replacement. Generally, redundancy is realized in a storage subsystem via a RAID (Redundant Array of Independent/Inexpensive Disks) technique and the like, so that the failure will not directly lead to data loss. Therefore, the drive having reached its life is blocked as failure and replaced with a new drive, to thereby elongate life of the subsystem. When a drive is blocked, the RAID uses a new drive to perform a rebuilding process, so the subsystem must allow deterioration of processing performance and deterioration of availability until the process is completed. Patent Literature 1 teaches an art of performing maintenance in a preventive manner by copying data to a spare drive before failure. However, the concept of the method for coping with the problem of life is the same as failure replacement.

The other method is a method for further adding a flash memory drive or a RAID configuration group composed of multiple flash memory drives, realizing elongation of life by performing load distribution of the amount of rewrites. Generally, in a flash memory drive, there is a technique of performing wear leveling using flash memory chips installed within the drive without deviation, wherein a technique for leveling the number of rewrites (number of erases) among multiple flash memory drives (FM packages) is taught, for example, in Patent Literature 2.

CITATION LIST

Patent Literature

[PTL 1] Japanese Patent Application Laid-Open Publication No. 05-100801
[PTL 2] WO 2011/010344

SUMMARY OF INVENTION

Technical Problem

However, there are two problems in the prior arts described above. The first problem is the replacement frequency. The write data related to a RAID group is written in a striped manner to all the drives constituting the same, so that the drives within the same RAID group reach their end of life substantially at the same timing. Therefore, even if the drives are replaced one at a time, drives must be replaced one after another as a result. During replacement, operations such as rebuilding or copying to different drives occur, which influence the system performance, but the user cannot cope with the matter actively. Further, if the replacement occurs near the life of the subsystem (such as five years), a drive having remaining life will be replaced meaninglessly during maintenance.

A second method exists to overcome such state, but there is no index for determining the quantity of capacity to be added to realize appropriate elongation of life. Therefore, the maintenance service provider cannot determine the validity of adding a drive. Further, as for the operation administrator, since the overall capacity of the system is increased, a problem may occur from the viewpoint of capacity management.

In consideration of the problems described above, the object of the present invention is to provide a subsystem and maintenance information capable of calculating the capacity required to overcome the shortage of life, and enabling a maintenance service provider to realize maintenance and replacement without performing unnecessary maintenance replacement. Another object of the present invention is to enable the operation administrator to manage rewrite life of the drives using an existing capacity operation management.

Solution to Problem

In order to solve the problems described above, the storage subsystem according to one preferred embodiment of the present invention has one or more storage controllers and multiple NVM (Non-Volatile Memory) drives, wherein the storage controller has a means to constitute a storage capacity pool using the NVM drives, calculates a remaining rewritable capacity of the constituted capacity pool, and based on the remaining rewritable capacity, determines whether shortage of the remaining rewrite life occurs or not during the operation period of the storage subsystem, wherein if it is determined that shortage of life will occur, a drive capacity required to be added to the pool to cover the shortage of life is calculated.

Advantageous Effects of Invention

According to the present invention, the required amount of capacity to be added to the pool for overcoming the shortage of life of the nonvolatile storage media can be recognized quantitatively, so that the maintenance of life can be realized by a minimum required capacity. Further, since the shortage of life is reflected to the reduction of pool capacity, the operation administrator can manage the capacity and life in a unified manner. The problems, configuration and effects other than those described above are made clear by the following description of preferred embodiments.

BRIEF DESCRIPTION OF DRAWINGS

FIG. 6 is a view showing a RAID group management information table according to the preferred embodiment of the present invention.

FIG. 7 is a view showing a pool management information table according to the preferred embodiment of the present invention.

FIG. 8 is a view showing a relationship between aging life, rewrite life and remaining rewritable capacity according to the preferred embodiment of the present invention.

FIG. 11 is an RG management table showing the relationship between RAID groups capable of being composed in the storage subsystem and the rewritable capacity (maintenance drive capacity).

DESCRIPTION OF EMBODIMENTS

Figure 1:
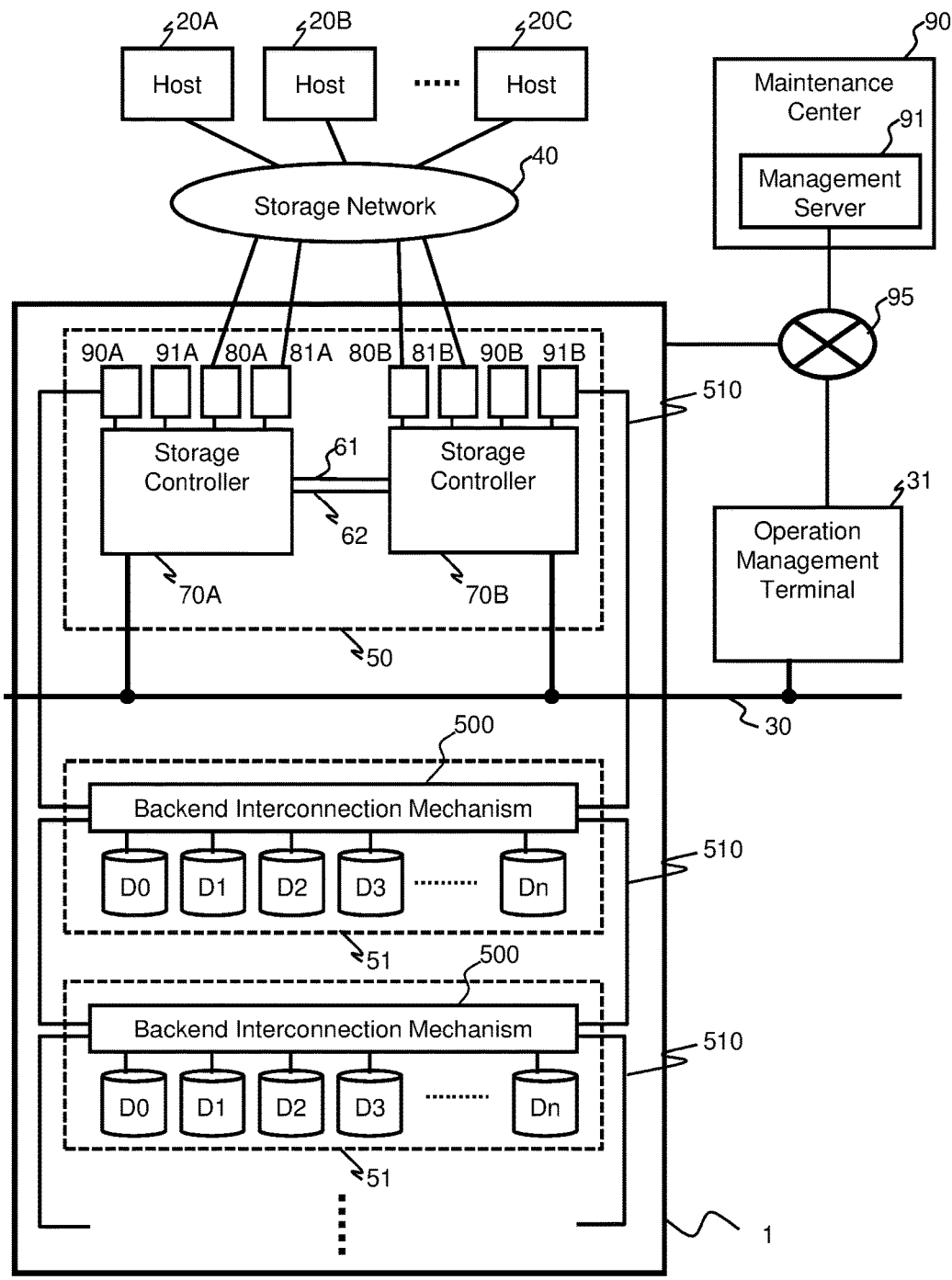
FIG. 1 is a block diagram showing a configuration of a storage subsystem according to the preferred embodiment of the present invention.

Now, the preferred embodiments of the present invention will be described with reference to the drawings, but an example that can be implemented by partially changing a preferred embodiment is illustrated as a modified example within the preferred embodiment. In the following description, various information are referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer programs can be installed to each computer from a program source. The program source can be provided via a program assignment server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

Embodiment 1

Embodiment 1 will be described with reference to FIGS. 1 through 9.

FIG. 1 is a block diagram showing a configuration of a storage system installing nonvolatile memory drives (NVM drives) having a limitation to the rewritable frequency according to the present embodiment. NVM drives D0 through Dn are modules having SSDs, add-in cards or other original forms, for example. A storage subsystem 1 is composed of a controller chassis 50 and a drive chassis 51. However, the respective chassis may not be distinguished if the storage subsystem 1 is realized by a general-purpose server device and the like. The storage subsystem 1 is connected to an operation management terminal 31 via a management network 30, and the setting of the subsystem or acquisition of information can be realized through the operation management terminal 31. The operation management terminal 31 can be included as a portion of the storage subsystem 1.

The storage subsystem 1 is connected to the host computers 20A through 20C via a storage network 40. The storage network 40 is realized via a Fibre Channel or the Ethernet (Registered Trademark) network, or a PCI-Express (Registered Trademark). In host computers 20A through 20C, operating systems and applications running on the OS are operated, and I/Os are issued to the storage subsystem 1. When the storage subsystem is realized via a general-purpose server device and the like, the host computer and the storage subsystem may physically be the same, and in that case, the storage network 40 may be omitted. Further, the host computer may be realized in a software-like manner, as in the case of a virtual machine.

NVM drives D0 through Dn are connected to storage controller packages 70A and 70B through a backend connection mechanism 500 provided to the drive chassis 51, a backend connection wiring 510, and I/F cards 90A and 90B disposed within the controller chassis 50. The backend interconnection mechanism 500 is a SAS (Serial Attached SCSI) expander or a PCI-Express switch, for example, and the backend connection wiring 510 is a SAS cable or a PCI-Express cable, for example. The I/F cards 90A and 90B are HBAs (Host Bus Adapters) installing an SAS protocol chip, or PCI-Express extension boards, for example.

The controller chassis 50 has storage controller packages 70A and 70B in which a storage control program is operated, the aforementioned I/F cards 90A and 90B for connecting drives, and I/F cards 80A, 81A, 80B and 81B for connecting to the host computers 20A through 20C. The two controllers are mutually connected via multiple internal data transfer paths 61 and 62 for mutually transferring data.

In the present embodiment, there are two package systems, which are system A and system B, but it is possible to provide more than two packages which are mutually connected, or have an I/F card (such as 91A or 91B) connect multiple storage controller chassis 50. It is also possible to have the system composed of only system A.

The operation management terminal 31 or the storage subsystem 1 is connected to a management server of a maintenance center 99 via a network 95. Thereby, it becomes possible to acquire information such as a remaining rewritable capacity or a remaining life of a pool composed of NVM drives described later, and to monitor and manage the state of the storage subsystem 1. Further, a management server 991 can perform remote maintenance operation from a maintenance center or transmit maintenance charge information to the operation management terminal 31. It is also possible to have the management server 991 directly connected to the storage subsystem 1.

Figure 2:
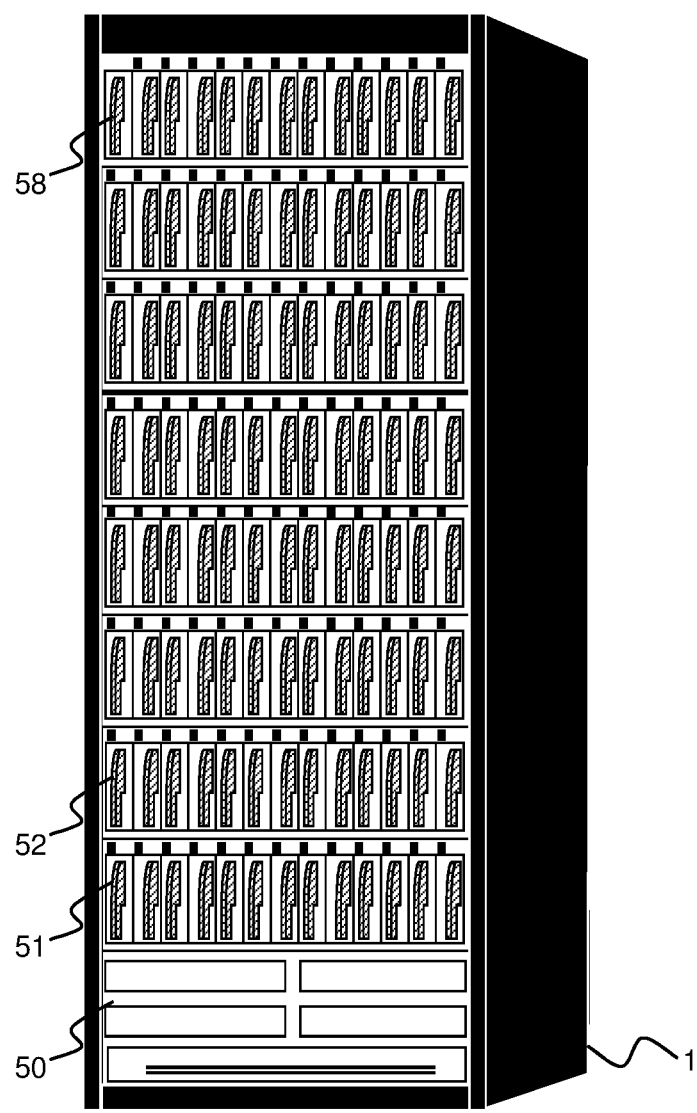
FIG. 2 is a view showing an outer appearance of a storage subsystem according to the preferred embodiment of the present invention.

FIG. 2 is an outer view illustrated to help understand the storage subsystem according to the present embodiment.

The controller chassis 50 of the storage subsystem 1 is installed to the lower section of a rack illustrated in the drawing, and on the upper area thereof are shown drive chassis 51, 52 and 58. Although not shown in the drawing, on the rear side thereof are arranged the backend connection wiring 510 described earlier and cables constituting the storage network 40.

Figure 3:
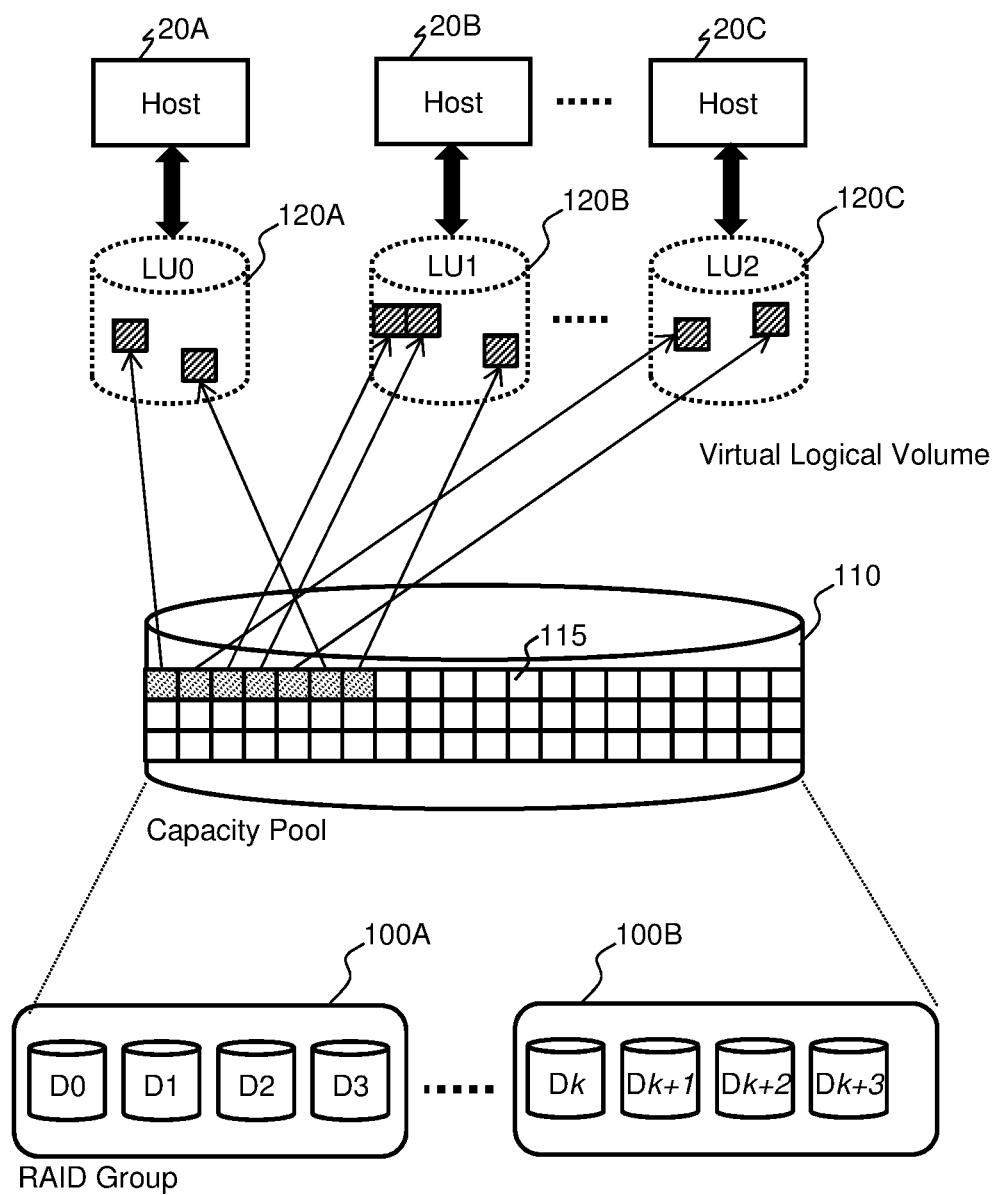
FIG. 3 is a schematic view showing the relationship between a virtual logical volume, a capacity pool, a RAID group and a drive according to the preferred embodiment of the present invention.

FIG. 3 is a view showing the relationship between virtual logical volumes 120A through 120C that the storage subsystem provides to the host computers 20A through 20C in the present embodiment, and capacity pool 110, page group 115, RAID group 100, and NVM drive Dn (D0 through D3 and the like).

The storage subsystem 1 according to the present embodiment adopts a technique called Thin Provisioning, where a virtual logical volume 120 is provided to the host computer 20, and the actual capacity is allocated only to the accessed portions.

The storage subsystem 1 constitutes a RAID using a few NVM drives Dn. This is called a RAID group. For example, in RAID group 100A, 3D+1P is composed using four drives, D0, D1, D2 and D3.

The capacity pool 100 is composed of one or more RAID groups. The capacity pool 110 is capable of adding a RAID group at an arbitrary point of time, and thereby, the capacity of the pool can be increased. Further, the capacity pool 110 is managed in pages 115, which are fixed length units divided into a few KB to a few MB sections.

The host computers 20A through 20C perform accesses using virtual logical volumes 120A through 120C provided by the storage subsystem 1. The virtual logical volumes 120A through 120C are free volumes having virtual capacities. When data is written to the virtual logical volume 120 from the host computer 20, the storage subsystem 1 allocates an entity in page 115 units from the capacity pool 110 to the relevant LBA area in the virtual logical volume 120. More specifically, the storage subsystem 1 has a page mapping information for managing the corresponding relationship between the LBA of the virtual logical volume and the LBA of the capacity pool in page units, and updates this information (not shown).

When determining the pages to be allocated, the storage subsystem 1 selects pages so that load is distributed among multiple RAID groups, and so that the number of rewrites will be leveled.

The capacity pool 110 is managed in units of pages 115, so that the meaning of the number of allocated pages is substantially the same as the already-used capacity of the capacity pool, and the meaning of the number of unallocated and usable pages is substantially the same as the free pool capacity.

Figures 4, 5:
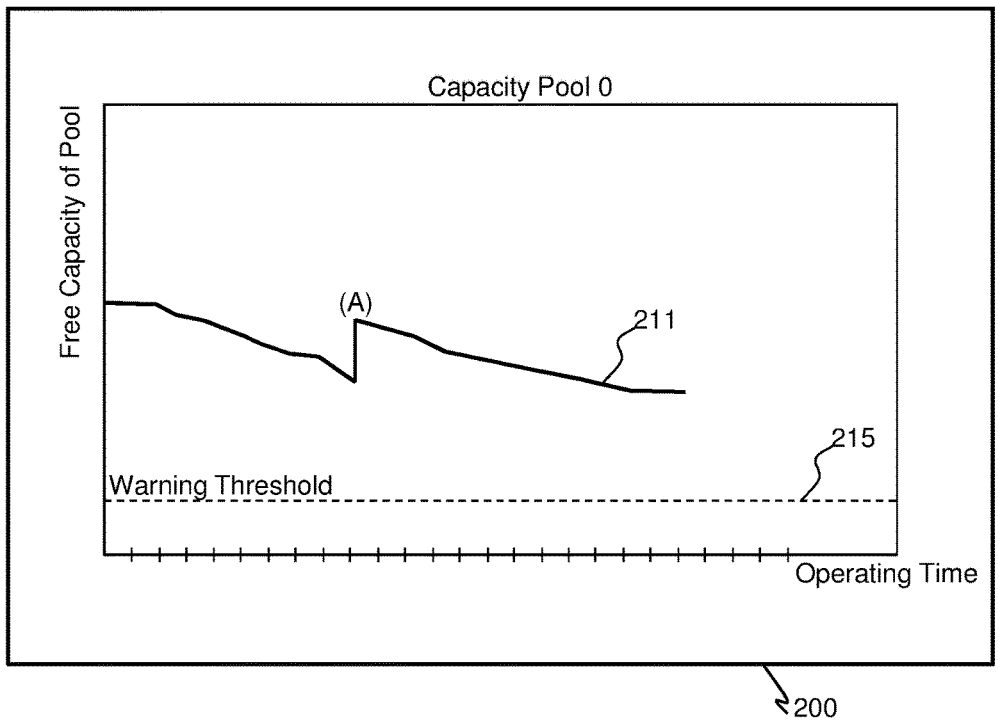
FIG. 4 is a view showing a management screen of a pool capacity of a storage subsystem according to the preferred embodiment of the present invention.
FIG. 5 is a view showing a management information table of a drive according to the preferred embodiment of the present invention.

FIG. 4 shows one example of GUI (Graphic User Interface) illustrating the transition of free capacity of capacity pools that the storage subsystem 1 of the preferred embodiment of the present invention provides via the operation management terminal 31. The horizontal axis of screen 200 shows an elapsed operating time (such as number of days or number of months) from when the operation of the capacity pool has been started, and the vertical axis shows the free capacity of the pool. A solid line 211 shows a transition of change of pool capacity, and for example, time point (A) shows the state where capacity addition to the pool is performed by which the free capacity has been recovered.

Dotted line 215 is a line showing a threshold value for preventing depletion of free capacity. When the line showing transition of free capacity 211 reaches this threshold (for example, 20% of the whole pool capacity or smaller), the storage subsystem 1 notifies (or warns) that addition of capacity to the pool (addition of a RAID group) is necessary to the operation administrator through the operation management terminal 31 or a device SNMP (Simple Network Management Protocol).

FIG. 5 shows one example of an NVM drive management table that the storage subsystem 1 according to the preferred embodiment of the present invention provides to the operation administrator through the operation management terminal 31. The NVM drive management table 250 is a table for managing the capacity, operation time, remaining lifetime and the like of each NVM drive. Based on the NVM drive management table 250, for example, it can be recognized that drive number 2 has a capacity of 1.6 TB, belongs to a RAID group (RG) 0, a rewrite life consumption rate (consumed life) thereof is 85%, a drive operation time is 34,278 hours, and a set BW (Byte Written), which is the rewritable capacity, is 12 PB.

FIG. 6 shows one example of a management information table of RAID groups (RG management information table 260) that the storage subsystem 1 according to the present embodiment provides through the operation management terminal 31. An RG management information table 260 is a table managing the capacity of each RG, a remaining rewritable capacity, a soundness state of the NVM drive (such as "good": high soundness and small deterioration; "warning": low soundness and high deterioration) and the like. For example, the RG management information table 260 shows that RAID group 0 (RG0) has a capacity of 4.8 TB, belongs to capacity pool PVOL 0, the remaining rewritable capacity (remaining BW) thereof is 3.2 PB, and the soundness state thereof is "good". Although not shown, the table can manage the set BW per RG (set BW per single NVM drive constituting the RG) similar to the NVM drive management table 250. The soundness state can be determined based on an absolute value of capacity of the remaining BW, or can be determined based on a relative value, which is the ratio (%) of the remaining BW with respect to the set BW.

FIG. 7 shows one example of a pool management information table similar to FIG. 6. The pool management table 280 is a table for managing the capacity and the remaining rewritable capacity of each pool, a deterioration state of the flash memory (low deterioration: "good"; high deterioration: "warning") and so on. For example, it can be seen that pool PVOL0 has a capacity of 19.2 TB, a remaining rewritable capacity (remaining BW) of 15.0 PB, shortage of capacity to product life is assumed to be 24 PB, and the state of the NVM drive is "warning". In the present embodiment, whether the state is "good" or "warning" is shown, but it is also possible to provide a state between "good" and "warning", such as "caution". Although not shown, the table can manage the set BW per pool (total set BW of the RGs belonging to the pool), similar to the NVM drive management table 250. The soundness state can be determined based on an absolute value of the capacity of the remaining BW, or can be determined based on a relative value, which is the ratio (%) of the remaining BW with respect to the set BW.

FIG. 8 shows a schematic view of the relationship between aging life (product life) of the NVM drive and rewrite life, which varies depending on the amount of write to the NVM drive. The rewrite life is also varied by the write interval, write pattern or temperature, but the description thereof will be omitted since it does not relate to the essence of the present description. A drive is taken as an example in FIGS. 8 (1) and 8 (2), but the concept is the same even when the drive is replaced with a RAID group or a pool. It is also possible to have the information equivalent to FIG. 8 displayed on the operation management terminal 31 or the operation management server 81.

The NVM drive has a rewritable capacity (set BW) defined when it was designed, wherein if rewrite is performed more frequently than assumed, the drive reaches its rewrite life before reaching its aging life (FIG. 8 (1)), while on the other hand, if rewrite is performed less frequently than assumed, the NVM drive fulfills its aging life (product life) (FIG. 8 (2)). In a sense, aging life corresponds to a freshness date of a product, and in the case of an enterprise product, for example, the aging life is five years from the beginning of use.

Whether the drive reaches its rewrite life before reaching its aging life or not can be comprehended to a certain extent by the magnitude relationship with a line assuming uniform use of the device where rewrite life and aging life are fulfilled equally.

FIG. 8 (1) illustrates a case where write is performed greater than the assumed value (that is, the remaining rewritable capacity is reduced speedily). An assumption line 310 is a line showing the reduction of the case where the drive is utilized at a uniform pace so that the rewrite life and the aging life are substantially equivalent. As suggested by its name, an actual transition 320 shows the extrapolation by a dotted line of the case assuming that the device is continued to be used by such inclination. A difference 330 between points (a) and (b) shows the rewritable capacity consumed greater than assumed at a current time point 350. If the drive is continuously used in this pace, the drive shown in the drawing will end its rewrite life at point 360 where the dotted line crosses the horizontal axis. Further, a difference 340 between points (c) and (d) shows the expectation value of rewritable capacity that will be insufficient in fulfilling the aging life.

FIG. 8 (2) shows a case where write is performed less than the assumed value, opposite to FIG. 8 (1). A difference 331 shows a rewritable capacity remaining compared to the assumed value. If the drive is continuously used in this pace, the surplus to the assumption will be gradually expanded. A difference 341 is the rewritable capacity that will be a surplus when the drive reaches its aging life.

We will assume an example of leveling the load of rewrite between two drives illustrated in FIGS. 8 (1) and 8 (2). At the point of time shown by difference 330 and difference 331, the difference 330 indicating shortage is greater than the difference 331 indicating surplus, so that even if the loads are leveled, the result will fall below the assumption line. In other words, it is determined that the drive cannot satisfy its aging life.

On the other hand, even when it is determined that shortage will occur at the current time point, the difference 341 indicating surplus is greater than the difference 340 when the values are compared at the aging life time point, so that if leveled, the result will exceed the assumption line. Therefore, it is determined that the drive satisfies its aging life.

As mentioned above, even when the compared values result in shortage at the current time point, it does not necessarily mean that shortage will occur in the future. Further, the excess or shortage determined at the current time point is calculated based on the simple comparison of the acquired values, so that the calculation costs are small, but an expectation value must be calculated to obtain the future excess or shortage, and statistical processing of the transition of values must be performed, so that the related calculation costs are high. Based on the above, we will describe the management of life according to the present storage subsystem 1 with reference to FIG. 9.

Figure 9:
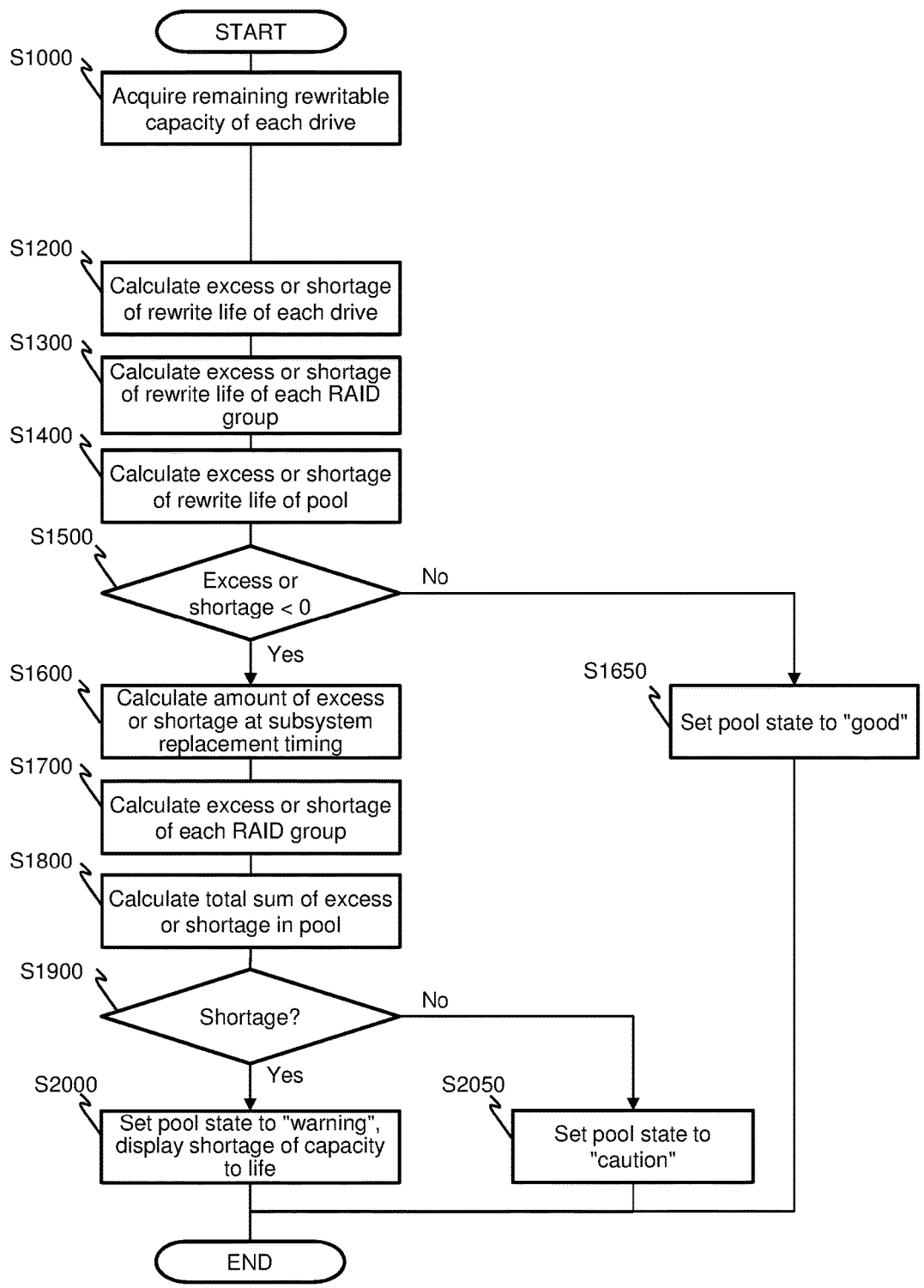
FIG. 9 is a flowchart showing a monitor control flow for managing the pool life by the storage subsystem according to a first preferred embodiment of the present invention.

FIG. 9 is a flowchart showing a monitor control flow for managing the pool life according to the storage subsystem 1 of the present embodiment. The processing of the present flowchart is executed at a certain timing, such as once per a certain period of time or capacity addition to a pool, by a storage controller 70 of the storage subsystem 1.

The storage subsystem 1 acquires a remaining rewritable capacity of each drive initially contained in the pool using means such as SMART (Self-Monitoring Analysis and Reporting Technology) or a LOG SENSE command (S1000). When the remaining rewritable capacity cannot be directly acquired, the storage subsystem 1 infers the remaining rewritable capacity based on information that can be acquired by the storage controller, such as the transition of life consumption rate of the drive, a WA (Write Amplification) rate, the number of error blocks and so on. The storage subsystem 1 can also obtain the remaining rewritable capacity of each drive based on a total destage capacity and the like.

Then, the storage subsystem 1 calculates the excess or shortage of rewrite life at the current time point based on the difference from the assumption line calculated by the specification of the relevant drive (S1200).

Next, the storage subsystem 1 calculates the excess or shortage of rewrite life of the RAID group based on the excess or shortage of rewrite life of each drive (S1300). Specifically, the value of the drive whose shortage of life is greatest of the RAID group is set as the value of the relevant RAID group. This is because the RAID group will be degraded if even one drive fails. The life can also be computed based on the timing of blockade instead of degradation.

When the leveling of write is performed across multiple RAID groups, the excess or shortage of life of a pool can be considered as the total sum of the excess or shortage of the RAID group. Therefore, the storage subsystem 1 calculates the total sum of the excess or shortage of the rewrite life of each RAID group, to thereby obtain the excess or shortage of rewrite life of the pool (S1400).

Then, the storage subsystem determines whether the rewrite life of the pool is short at the current time point, that is, whether the total sum of the excess or shortage of the rewrite life of the pool is negative or not (S1500). Further, it is possible to perform a "notice of warning/caution of pool state" after S1500, as in S2000 or S2050 described later.

When it is determined that there is no shortage of rewrite life of the pool at the current time point (S1500: No), the storage subsystem 1 updates the monitored result as "good" in the pool management table 280 (S1650), and ends the process.

On the other hand, when it is determined that shortage will occur (S1500: Yes), the storage subsystem 1 enters a process to calculate the expectation value of each drive to recognize how much shortage of rewritable capacity of the pool will occur before the subsystem is replaced (process starting from S1600). It should be noted that the value to be obtained here is the amount of shortage at the time point of replacement of the subsystem, and not the value at the time point when the aging life of each drive is reached. The reason for this is because a drive that has been added during operation will not fulfill its aging life before the whole storage subsystem is replaced. The period of time from the introduction of a storage subsystem 1 to the replacement thereof, that is, the product life time of the storage subsystem, will be set to the same value as a standard guarantee period of the subsystem (such as five years), unless designated otherwise.

The storage subsystem 1 calculates the reduction slope of the rewritable capacity of each drive based on the past statistical information. Then, it calculates the relevant write required capacity at the time of replacement of the own subsystem itself based on an extrapolation method (extrapolation: a method for obtaining expected values outside a data range based on certain known numerical data). Then, based on the difference from the assumption line, the storage subsystem calculates the amount of excess or shortage of the rewritable capacity of each drive (S1600).

Next, the storage subsystem 1 calculates the excess or shortage of each RAID group by a similar method as S1300 (S1700). Thereafter, it finally computes the total amount of excess or shortage of the pool (S1800). By setting and calculating the assumption line of the rewritable capacity and the remaining rewritable capacity based on actual rewrite per drive for each RG or each pool as mentioned earlier, it becomes possible to manage the storage capacity from a macro-perspective.

When it is determined that shortage will occur (S1900: Yes), the storage subsystem 1 determines that shortage of rewrite life has occurred at the current time point to the relevant capacity pool, and that it is assumed that shortage will also occur in the future. Therefore, in order to prompt addition of a drive to the capacity pool, the storage subsystem 1 sets the state of the relevant pool to "warning" in the pool management table 280, and displays the value obtained in S1400 as shortage of rewritable capacity to product life (S2000).

On the other hand, when it is determined that shortage will not occur before the subsystem is replaced (S1900: No), the storage subsystem 1 determines that shortage has occurred at the current time point but there is little need to add a drive to the storage subsystem 1. Therefore, the storage subsystem 1 sets the state of the relevant pool to "caution" in the pool management table 280 (S2050), and ends the process. As shown in FIG. 8 (2), there may be a case where the rewrite life exceeds the product life, so that it is also possible to adopt an operation where the use of the storage subsystem 1 is started with a small pool capacity at first, and then the above-described processes are performed at appropriate timings to add the pool capacity.

Figure 10:
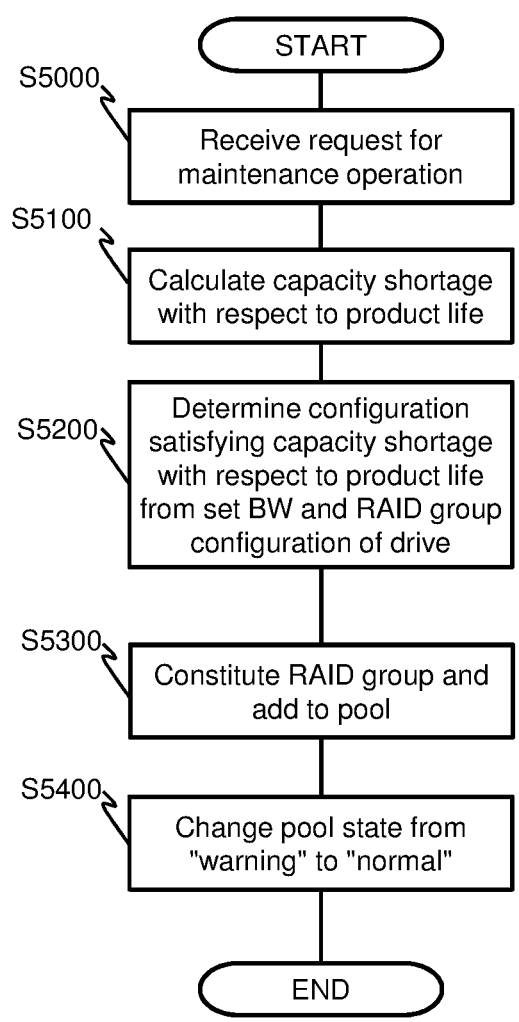
FIG. 10 is a flowchart of maintenance operation.

With reference to FIGS. 10 and 11, we will describe the maintenance performed when the pool life has been set to "warning" in the storage subsystem of the present embodiment. FIG. 10 is a flowchart of the maintenance operation, and FIG. 11 is an RG management table 600 showing the correspondence between the RAID group capable of being composed according to the present storage subsystem and the rewritable capacity (maintenance drive capacity). In this description, we will assume that the operation administrator of the storage subsystem has signed a maintenance service contract with a maintenance service provider of the storage subsystem.

When the pool life is set to "warning", the operation administrator requests the maintenance service provider to perform maintenance operation at any time or at planned timings. In order to do so, the operation administrator enters the request for maintenance operation to the operation management terminal 31, and the operation management terminal 31 having received the request information of the maintenance operation transmits the same to a maintenance management server 991 at a maintenance center 90 (S5000). The maintenance management server 991 (at the maintenance service provider side) refers to the pool management table 280 illustrated in FIG. 7, or a maintenance dedicated screen corresponding thereto, and calculates the shortage of rewritable capacity to product life of the pool (S5100). Then, the maintenance provider acquires a configuration to satisfy the shortage capacity from the set rewritable capacity (set BW) of the drive for maintenance and the possible RAID group configuration (S5200).

For example, it is assumed that the shortage of capacity to product life is 24 PB, as shown in FIG. 7. If the set BW of the drive A for maintenance used currently is 12 PB, it can be recognized that the shortage can be solved by adding a RAID group having two or more data drives based on the calculation "24 PB÷12 PB=2". From table 600 of FIG. 11, it can be seen that the configuration having the relevant capacity is 3D+1P of No. 1, or 3D+2P of No. 10. Therefore, the maintenance management server 991 (on the maintenance provider side) determines a RAID configuration having the data drive (NVM drive) to be added based on the contents of the maintenance service contract. For example, it is assumed that the RAID configuration having the data drive added by the maintenance management server 991 is 3D+1P of No. 1 (capacity 36 PB=12 PB/drive×3 data drives).

The maintenance provider loads the necessary number of maintenance drives to the storage subsystem 1, and constitutes a RAID group (3D+1P in the present example) from the terminal for maintenance operation or the operation management terminal 31. Then, the maintenance provider adds an NVM drive of the constituted RAID group to the pool whose state is set to "warning". The storage subsystem 1 receives information related to the added RAID group (S5300).

When a RAID group is added, the maintenance flow illustrated in FIG. 9 is executed in the storage subsystem 1, and the state of the pool is diagnosed again. The shortage of capacity to product life of the pool before adding the capacity is 24 PB, and a RAID group having the rewrite life of 36 PB has been currently added, so that the total sum of excess or shortage of the pool is changed from a negative value (−) of −24 PB to a positive value (+) of +12 PB. Therefore, the storage subsystem 1 turns off the "warning" display on the operation management terminal 31.

The maintenance provider confirms that the state of the relevant pool has become other than "warning", and ends the maintenance (S5400).

In the above process, the storage subsystem 1 according to the preferred embodiment of the present invention determines the excess or shortage of capacity by a small amount of calculation based on the value acquired at the current time point, and if necessary, determines the future excess or shortage of capacity and show the value in a quantitative manner, so that the capacity to be added to the pool can be recognized and the maintenance can be performed by the minimum necessary capacity.

Modified Example 1 of Embodiment 1

According to Embodiment 1, the maintenance management server 991 (maintenance operator side) has determined the RAID configuration based on the rewritable capacity of the maintenance drive and the RG management table 600 of the configurable RAID group. However, it is possible to have the storage subsystem 1 itself determine the above instead of the maintenance management server 991, and to provide the information of the configuration to be added to the pool management table 280. This arrangement enables to reduce operation misses caused by the maintenance operator, and therefore, a more reliable maintenance becomes possible.

Modified Example 2 of Embodiment 1

In Embodiment 1, the configuration of a storage subsystem being added to a pool after configuring a RAID has been illustrated, but there also is a storage subsystem that can be added to a pool in drive units without configuring a RAID group in advance. In the case of such device, the storage subsystem 1 can store the information on the shortage of drive capacity or the shortage of the number of drives instead of the shortage of rewritable capacity to product life to the pool management table 280, and notify the same to the operation management terminal 31 or the maintenance management server 991. In that case, an even more minimized maintenance becomes possible, since there is no limitation related to RAID group configuration. Further, a more reliable maintenance becomes possible since operation misses caused by the maintenance operator can be reduced. Instead of having the maintenance operator add an NVM drive, it is possible to load an NVM drive for adding an RG to the storage subsystem 1 in advance, and to use the same to realize automatic RG configuration to be added to the pool.

Embodiment 2

Embodiment 1 has illustrated a method to perform maintenance by providing the information on the shortage of pool life that will be required during operation of the subsystem as the shortage of rewritable capacity. However, the operation administrator still had to perform both the management from the viewpoint of life (FIG. 7) and the maintenance from the viewpoint of use of capacity (FIG. 4) independently. Therefore, Embodiment 2 enables to manage the life only by managing capacity, by reflecting the shortage of pool life on the transition of pool capacity as shown on the screen 200 of FIG. 4. The configuration of the subsystem according to the present embodiment is the same as Embodiment 1, but since the notification method varies from the process performed when shortage of life occurs, only the difference from Embodiment 1 will be described.

Figure 12:
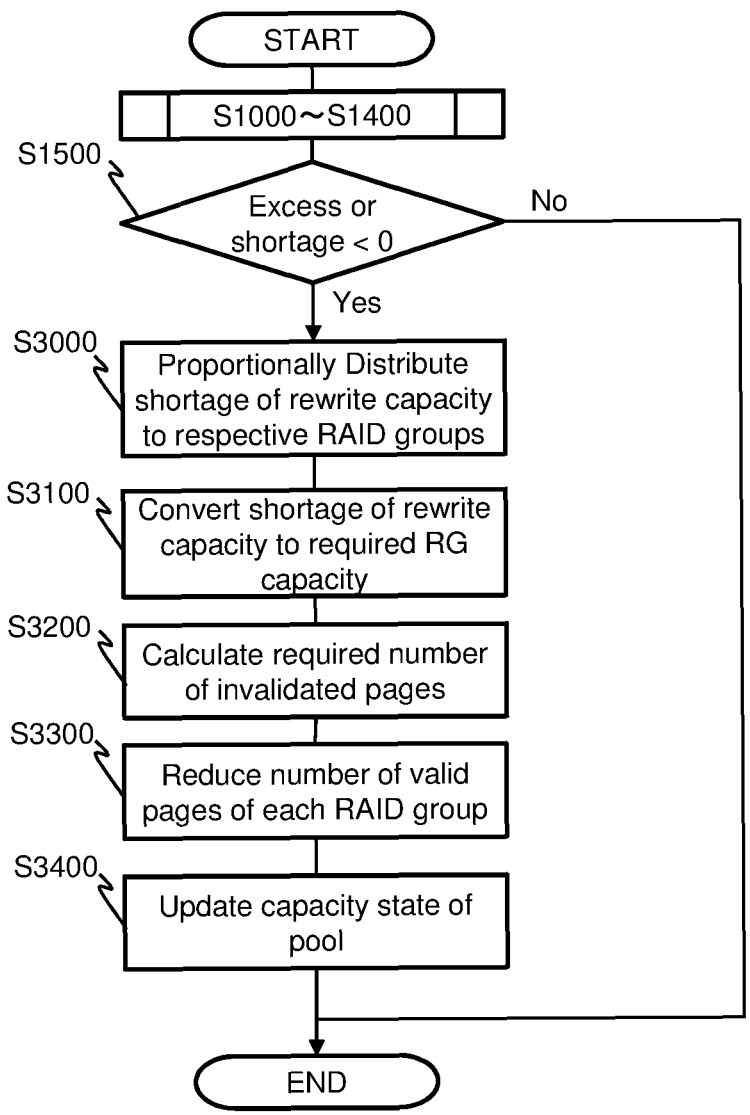
FIG. 12 is a flowchart showing the operation for performing life management of a pool by the storage subsystem 1 according to the preferred embodiment of the present invention.

FIG. 12 is a flowchart illustrating an operation of a case where the storage subsystem 1 according to the present embodiment performs life management of a pool. Steps S1000 (acquisition of rewritable capacity of each drive) through S1400 (calculation of excess or shortage of rewrite life of pool) are the same as Embodiment 1 (FIG. 9), so the descriptions thereof are omitted.

When it is determined that there is shortage in the rewrite life of the pool (S1500: Yes), the storage subsystem 1 calculates the necessary storage capacity required to cover the shortage of rewrite life, and performs a process to set the relevant capacity to unavailable, that is, to reduce the same from the pool capacity. Thereby, the capacity having been added by maintenance according to Embodiment 1 can be allocated from an existing pool prior to maintenance. In the following description, it is assumed that the use of the RAID group contained in the pool is leveled.

According to the capacity ratio of the RAID group contained in the pool, the storage subsystem 1 performs proportional distribution of the shortage of rewritable capacity to the respective RAID groups according to the ratio of capacity of the RAID groups included in the pool (S3000). For example, in FIG. 6, the pool PVOL0 is composed of RAID groups RG0, RG1 and RG2, and the capacity of the respective RAID groups are 4.8 TB, 4.8 TB and 9.6 TB, respectively, so that the shortage of rewritable capacity is proportionally distributed by 1:1:2.

Thereafter, the storage subsystem 1 specifies the drive determining the remaining rewritable capacity of the RAID group, multiplies the ratio of the capacity of the relevant drive and the set rewritable capacity (set BW) to the shortage of rewritable capacity subjected to proportional distribution, and calculates the capacity that should be set to unavailable in the relevant RAID group to cover for the shortage. That is, the capacity is calculated as follows: "shortage of rewritable capacity subjected to proportional distribution×(drive capacity÷set BW of drive)" (S3100).

For example, we will assume here that in RG0, the shortage of rewritable capacity being proportionally distributed is 6 PB. Based on FIG. 5, the capacity of the drives constituting RG0 is all 1.6 TB, and the set BW is 12 PB. Therefore, based on the calculation "6 PB×(1.6 TB÷12 PB)=0.8 TB", it can be recognized that in RG0, RG capacity of 0.8 TB should be invalidated.

Based on the obtained capacity, the storage subsystem 1 calculates how many pages should be invalidated (set to unavailable) from page 115 belonging to the relevant RAID group (S3200). For example, when the size of the page 115 is 40 MB, it can be recognized that in RG0, 0.8 TB/40 MB=20 K pages must be invalidated. In this manner, the number of pages acquired in the respective RAID groups is deleted from the valid pages (S3300).

Then, the storage subsystem 1 updates the transition screen of the pool capacity via periodic monitoring, and ends the process (S3400).

As mentioned earlier, the number of valid unused pages has the same meaning as the free capacity of the pool, so that the reduction of the number of effective pages corresponding to the shortage of pool life by the process described above is equivalent to reducing the available pool capacity.

Figure 13:
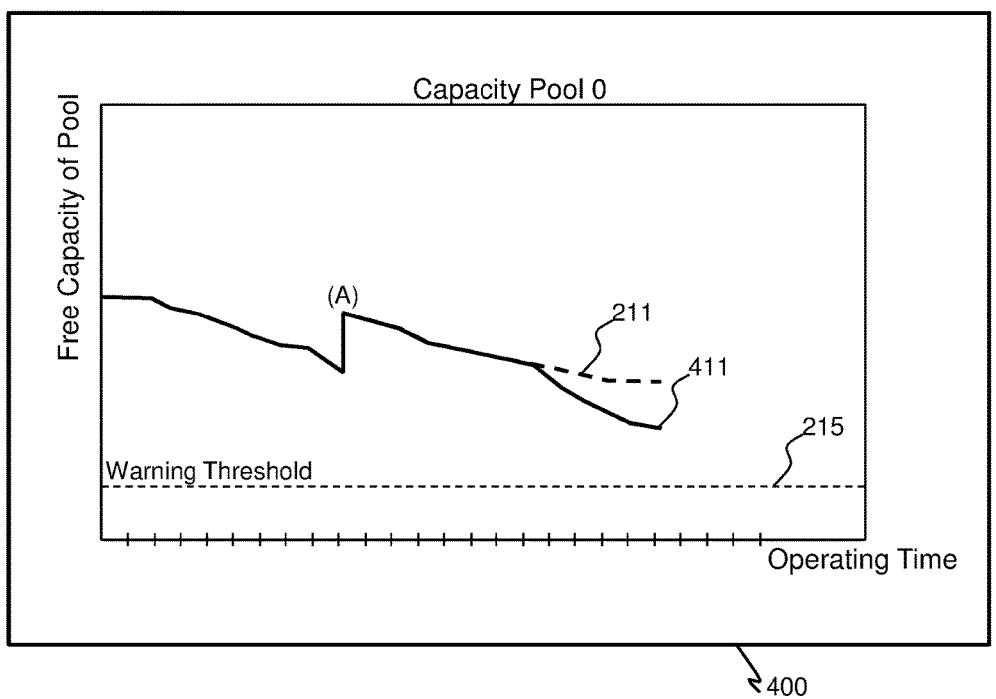
FIG. 13 shows one example of a GUI showing the transition of free capacity of the capacity pool provided by the storage subsystem 1 through the operation management terminal 31 according to the preferred embodiment of the present invention.

FIG. 13 is a view showing one example of a GUI showing the transition of the free capacity of the capacity pool that the storage subsystem 1 provides via the operation management terminal 31 according to the present embodiment. In screen 400, in addition to a dotted line 211 showing the transition of the capacity pool by page allocation to virtual logical volumes, a line 411 reflecting the shortage of life is illustrated. In a state where there is no shortage of life at all, the dotted line 211 corresponds to line 411. On the other hand, when data update of an existing page is performed in a state where shortage of life is beginning to occur, the dotted line 211 will not be varied since a new page consumption has not occurred, but the line 411 will indicate a reduced position than before since consumption of life by rewrite (amount of shortage) increases. Accordingly, the operation administrator can manage the life together by simply managing the transition of pool capacity as shown in screen 400.

Figure 14:
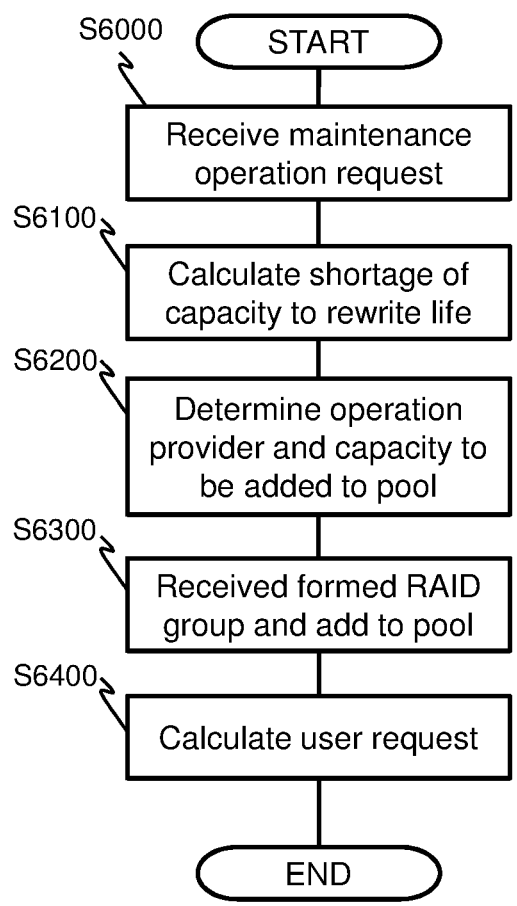
FIG. 14 is a flowchart illustrating a form of maintenance management according to the present embodiment.

FIG. 14 is a flowchart illustrating the state of a maintenance method according to the present embodiment. The difference from Embodiment 1 is that the remaining amount of the pool has dropped, and that the maintenance timing is not necessarily the life. In other words, a case can be included where the remaining amount of the pool is reduced simply through allocation of capacity to the virtual logical volumes 120.

In the following description, similar to Embodiment 1, the operation administrator has signed a maintenance service contract with a maintenance provider, so that the capacity corresponding to the life maintenance portion is maintained without charge. On the other hand, the adding of capacity for allocation to virtual logical volumes will be charged (purchasing of a pool).

When the remaining quantity of the pool has started to reduce, the operation administrator requests maintenance to add capacity to the pool through planned maintenance. In order to do so, the operation administrator enters the request for maintenance operation to the operation management terminal 31, and the operation management terminal 31 having received the request information of the maintenance operation transmits the same to the maintenance management server 991 of the maintenance center 90 (S6000). In another example, maintenance can be automatically requested by the operation management terminal 31 based on a rule that the operation administrator has set to the operation management terminal 31.

The maintenance management server 991 (maintenance provider side) acquires (confirms) the screen 400 of FIG. 13 or the maintenance management information corresponding thereto, and calculates (confirms) the reduction state of the pool and the reduction portion of life (S6100).

Therefore, the maintenance management server 991 (maintenance provider side) determines the capacity to be added to the pool or the RAID group configuration based on the contents of the maintenance contract or the information such as the maintenance procedure manual and the like determined by the operation administrator (S6200). The maintenance provider adds the determined RAID group configuration to the pool of the storage subsystem 1. The storage subsystem 1 receives the information related to the added RAID group (S6300).

The maintenance management server 991 (maintenance provider side) acquires (confirms) the result of having the added capacity reflected safely as free capacity pool. The maintenance management server 991 (maintenance provider side) calculates the maintenance cost of adding the capacity by discounting the maintenance cost for adding the capacity covering the reduction corresponding to life regarding the added pool capacity, and transmits a maintenance cost charge information to the operation management terminal 31 (operation administrator side). The operation management terminal 31 (operation administrator side) receives the maintenance cost charge information from the maintenance management server 991 (maintenance provider side) (S6400). Thus, the processing in the storage subsystem 1 including the operation management terminal 31 and the maintenance management server 991 of the maintenance center 99 is completed.

According to the preferred embodiment described above, the operation administrator can simplify the operation since the operation can be performed by monitoring only the change of capacity without having to independently manage the pool life and the capacity change caused by the genuine use of the pool. Further, maintenance requiring minimum costs is enabled since the maintenance provider does not have to distinguish life maintenance and capacity maintenance, and can integrate the maintenance by adding capacities to the pool. Further, since the range of the capacity added without charging fees is clarified by the storage subsystem, appropriate fees can be charged to the operation administrator.

Modified Example 1 of Embodiment 2

On screen 13 of Embodiment 2, the reduced capacity portion by life and the capacity allocated to the virtual logical volumes are shown independently, but since the operation administrator is not required to consider the life itself, it is also possible not to display the life portion of the capacity purposely (in other words, to display only the display line 411).

In that case, operation similar to prior art storage subsystems installing only HDDs can be adopted.

Further, the maintenance provider can charge the maintenance costs related to the added capacity corresponding to the write quantity to the operation administrator, so that a fair maintenance service can be provided both to a user using the subsystem via a high I/O (user having a significant shortage of life) and a user using the subsystem with a low I/O (user having a small or no shortage of life).

As described, according to the preferred embodiment of the present invention, maintenance can be realized by smaller number of maintenance operations and costs compared to the prior art NVM drive replacement. For example, in a pool composed of 3 RGs, wherein each RG is formed of 3D+1P, if maintenance replacement is caused one year before the product life, according to the prior art, it was necessary to replace a total of twelve drives (four drives/RG×3 RG) and a minimum of four maintenance operations (only one drive can be replaced per single maintenance for each RG).

On the other hand, according to the preferred embodiment of the present invention, the pool capacity calculated by (three data drives×3 RG)÷(five year life/drive) should simply be added. The result of the calculation is approximately two drives, so that in maintenance operation, only a one-RG capacity (four drives) should be added just once. Therefore, compared to the prior art, the number of steps, the time and the costs of the maintenance operation (labor costs and material costs (such as the costs of drives)) can be reduced at least by approximately 70 percent. Further, by adding the drives in RG units, the access loads can be rebalanced within the pool (load can be distributed), so that the access performance from superior devices can be expected to be improved.

According further to the preferred embodiment of the present invention, the shortage of life of the NVM drives can be covered by the adding of pool capacities, so that the present invention can cope flexibly with the change of operation of the system. Therefore, according to the present invention, it becomes unnecessary to estimate the amount of rewrites when introducing the system or to select the model of the drives in response to the use condition (such as a high-durability model/read intensive model, and so on), so that advance designing can be simplified and the lead time before starting operation can be reduced. In addition, since there is no need to provide multiple models of NVM drives, it becomes possible to expect a large amount of products of the same type to be manufactured, based on which costs can be cut down and product costs can be reduced. Further, the capacity of NVM drives that is still usable (surplus) at the time when the life of the storage subsystem as product is fulfilled can be reduced, so that the amount of resources being discarded is reduced, and an environment-friendly product can be provided.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations. A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions.

The information such as programs, tables and files for realizing the respective functions can be stored in a storage device such as a memory, a hard disk or an SSD (Solid State Drive), or in a memory media such as an IC card, an SD card or a DVD. Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

1: Storage Subsystem
31: Operation Management Terminal
70: Storage Controller
100: RAID Group
110: Capacity Pool
115: Page (Capacity Pool Management Unit)
120: Virtual Logical Volume
200: Pool Free Capacity Management Screen
D0-Dn: NVM Drive
991: Maintenance Management Server

The invention claimed is:

1. A storage subsystem connected to a host computer and providing a storage area to a host computer, wherein the storage subsystem comprises:
a storage unit having one or more storage drives for storing data sent from the host computer; and
a controller configured to manage the storage drives;
wherein out of the storage drives, one or more RAID groups are composed using multiple nonvolatile memory storage drives having a predetermined available data rewritable capacity, and a pool is provided from the one or more RAID groups, and
the controller is further configured to:
calculate a data rewrite quantity from the host computer to the pool; and
obtain a remaining rewritable capacity of the pool based on the data rewrite quantity and the rewritable capacity of the pool at a predetermined timing or for each of a plurality of predetermined periods; and
determine a necessity of a process for increasing the rewritable capacity of the pool based on a transition of the obtained remaining rewritable capacity and an assumed operation period of the storage subsystem.

2. The storage subsystem according to claim 1, wherein the controller is further configured to:
predict a future transition of the remaining rewritable capacity from the transition of the obtained remaining rewritable capacity, and
determine the necessity of the process for increasing the rewritable capacity of the pool, from a comparison between the predicted future transition of the remaining rewritable capacity and the assumed operation period.

3. The storage subsystem according to claim 1, wherein the controller is further configured to:
determine the necessity of the process for increasing the rewritable capacity of the pool by comparing the transition of the obtained remaining rewritable capacity and an assumption line indicating a transition of the remaining rewritable capacity calculated from a specification of the storage subsystem.

4. The storage subsystem according to claim 1, wherein the controller is configured to:
when it is determined that the process for increasing the rewritable capacity of the pool is necessary, calculate a capacity to be increased.

5. The storage subsystem according to claim 1, wherein the controller is configured to:
when it is determined that the process for increasing the rewritable capacity of the pool is necessary, perform either adding one or more additional nonvolatile memory storage drives to the pool, adding an additional RAID group configured from a plurality of additional nonvolatile memory storage drives to the pool, or adding an unused storage area that is not provided to the host computer to the pool without providing the unused storage area to the host computer.

6. The storage subsystem according to claim 1, wherein the controller is further configured to:
when it is determined that the process for increasing the rewritable capacity of the pool is necessary,
calculate a remaining rewritable capacity of the respective nonvolatile memory storage drives from a data rewrite quantity of the respective nonvolatile memory storage drives;
calculate a remaining rewritable capacity of the one or more RAID groups based on the remaining rewritable capacity of the nonvolatile memory storage drives configuring the one or more RAID groups; and
calculate the remaining rewritable capacity of the pool based on the remaining rewritable capacity of the one or more RAID groups configuring the pool.

7. The storage subsystem according to claim 1, further comprising:
a management terminal configured to manage the storage subsystem is connected to the storage subsystem, and a management server configured to manage the management terminal and the storage subsystem is connected to the management terminal,
wherein the management terminal and the management server respectively have a display unit for displaying information, and
wherein the controller is further configured to:
when it is determined that the process for increasing the rewritable capacity of the pool is necessary, notify a warning to the management terminal or the management server.

8. The storage subsystem according to claim 1, wherein the controller is configured to:
when it is determined that the process for increasing the rewritable capacity of the pool is necessary, reduce a storage capacity provided to the host computer.

9. A maintenance operation method of a storage subsystem including a storage unit having one or more storage drives for storing data sent from the host computer, and, out of the storage drives, one or more RAID groups are composed using multiple nonvolatile memory storage drives having a predetermined data rewritable capacity, and a pool is provided using the one or more RAID groups, the method comprising:
a first step of calculating a data rewrite quantity from the host computer to the pool; and
a second step of obtaining a remaining rewritable capacity of the pool based on the data rewrite quantity and the rewritable capacity of the pool at a predetermined timing or for each of a plurality of predetermined periods; and
a third step of determining a necessity of a process for increasing the rewritable capacity of the pool based on a transition of the obtained remaining rewritable capacity and an assumed operation period of the storage subsystem.

10. The maintenance operation method of the storage subsystem according to claim 9, wherein the third step comprises:
a step of predicting a future transition of the remaining rewritable capacity from the transition of the obtained remaining rewritable capacity, and
a step of determining the necessity of the process for increasing the rewritable capacity of the pool based on a comparison between the predicted future transition of the remaining rewritable capacity and the assumed operation period.

11. The maintenance operation method of the storage subsystem according to claim 9, wherein the third step includes:
a step of determining the necessity of the process for increasing the rewritable capacity of the pool by comparing the transition of the obtained remaining rewritable capacity and an assumption line indicating a transition of the remaining rewritable capacity calculated from a specification of the storage subsystem.

12. The maintenance operation method of the storage subsystem according to claim 9, further comprising:
a step of, when it is determined in the third step that the process for increasing the rewritable capacity of the pool is necessary, calculating a capacity to be increased.

13. The maintenance operation method of the storage subsystem according to claim 9, further comprising:
a step of, when it is determined in the third step that the process for increasing the rewritable capacity of the pool is necessary, performing either of adding one or more additional nonvolatile memory storage drives to the pool, adding an additional RAID group configured from a plurality of additional nonvolatile memory storage drives to the pool, or adding an unused storage area that is not provided to the host computer to the pool.

14. The maintenance operation method of the storage subsystem according to claim 9, further comprising:
a step of, when it is determined in the third step that the process for increasing the rewritable capacity of the pool is necessary, calculating a remaining rewritable capacity of the nonvolatile memory storage drive from a data rewrite quantity of each of the nonvolatile memory storage drives, calculating a remaining rewritable capacity of the one or more RAID groups based on the remaining rewritable capacity of the nonvolatile memory storage drives configuring the one or more RAID groups, and calculating the remaining rewritable capacity of the pool based on the remaining rewritable capacity of the one or more RAID groups configuring the pool.

15. The maintenance operation method of the storage subsystem according to claim 9, further comprising:
a step of, when it is determined in the third step that the process for increasing the rewritable capacity of the pool is necessary, reducing a storage capacity provided to the host computer.

* * * * *